United States Patent [19]

Chunga, Sr.

[11] 3,758,202

[45] Sept. 11, 1973

[54] EYEGLASS FRAMES

[75] Inventor: Lorenzo Chunga, Sr., Brooklyn, N.Y.

[73] Assignee: Creative Product Lines INc., Somerset, N.J.

[22] Filed: Aug. 16, 1971

[21] Appl. No.: 171,816

[52] U.S. Cl............... 351/41, 351/60, 351/110, 351/124, 351/138, 351/154, 351/155
[51] Int. Cl. ....... G02c 1/02, G02c 5/04, G02c 3/00
[58] Field of Search................ 351/41, 136, 139, 351/154, 138, 140, 124, 158, 60, 110, 155

[56] References Cited
UNITED STATES PATENTS

| 3,394,980 | 7/1968 | Dym | 351/124 X |
| 772,196 | 10/1904 | Ward | 351/124 X |
| 3,186,001 | 5/1965 | Roeder | 351/158 |
| 3,475,083 | 10/1969 | Gitlin et al. | 351/158 X |

FOREIGN PATENTS OR APPLICATIONS

| 111,147 | 11/1917 | Great Britain | 351/41 |

Primary Examiner—David Schonberg
Assistant Examiner—Paul A. Sacher
Attorney—Allison C. Collard

[57] ABSTRACT

Eyeglass frames for supporting lenses adjacent the eyes of the wearer consisting of a plurality of supporting members, having their longitudinal axes disposed vertically with respect to the face of the wearer, mounted on the upper and lower edges of the lenses. The members engage the skin adjacent the eye socket of the individual wearing the glasses and provide a movable support for the lenses adjacent the eye of the user. If desired, the frames may also include a nose bridge member to furnish additional support on the nose of the wearer. The support members are secured to the face of the wearer by adhesive means disposed on the ends of the support members, and are slidably engaged on the edges of the lenses so as to be adjustable during use.

4 Claims, 4 Drawing Figures

PATENTED SEP 11 1973 3,758,202

INVENTOR.
LORENZO CHUNGA Sr.
BY
ATTORNEY.

EYEGLASS FRAMES

The present invention relates to eyeglasses, and in particular, to adjustable lens support members for holding corrective or tinted eyeglass lenses adjacent the eyes of the wearer.

Conventional eyeglass frames are often bulky, and therefore, not conveniently stored or carried on the person of the wearer. They also may weigh a substantial amount. The fitting of conventional frames properly to each individual is often complicated, since eye-to-eye, ear-to-ear, nose bridge and head width differences must be considered to obtain a proper fit. Furthermore, because conventional frames support the eyeglass lenses at a considerable distance from the eye, the lenses are ground with a curvature which often results in visual distortion from parallax effects, and a reduction in the corrected field of vision.

Accordingly, the present invention provides eyeglasses which are supported adjacent the eyes of the wearer. A plurality of supporting members, which have their longitudinal axis disposed vertically with respect to the face of the wearer, are mounted on the upper and lower edges of the lenses and engage the skin adjacent the eye socket of the individual. The support members are substantially I-shaped, and include horizontally disposed slots provided in one of the ends thereof which frictionally engage and receive the edges of the lenses to permit detachable and adjustable securement of the support members to the lenses. A horizontally disposed nose bridge member, mounted on the lateral edges of the lenses, may also be provided to furnish additional support for the lenses on the nose of the wearer. Lens frames encompassing the entire periphery of the eye-glass lenses, integrally formed with the supporting members, may also be provided if desired. Suitable adhesive means, such as adhesive tape, is secured to the ends of the support members which engage the skin of the wearer, to mount the lenses securely adjacent the eyes of the wearer. The adhesive tape used may also contain metallic material to permit the support members to be removed from the person's face without removing the adhesive tape from the skin of the wearer. This permits easy adjustment of the position of the support members on the lenses, and thus the position of the lenses in front of the eyes of the wearer, during use.

It is therefore an object of the present invention to provide eyeglass frames which are more compact, lighter in weight and lower in cost than conventional eyeglass frames.

It is another object of the present invention to provide eyeglass frames which support the eyeglass lenses adjacent the eye of the wearer so that visual correction is more exact, and visual distortion is less, than conventional eyeglass frames.

It is a further object of the present invention to provide eyeglass frames which may be fabricated and delivered directly to the wearer, and which may thereby eliminate fitting costs.

It is also an object of the present invention to provide eyeglass frames which are simple in design, easy to manufacture, and efficient and reliable in operation.

Other objects and features of the present invention will become apparent from the following detailed description considered in connection with the accompanying drawings. It is to be understood, however, that the drawings are designed for the purpose of illustration only and not as a definition of the limits of the invention.

In the drawings, wherein similar reference numerals denote similar elements throughout the several views.

Figure 1:
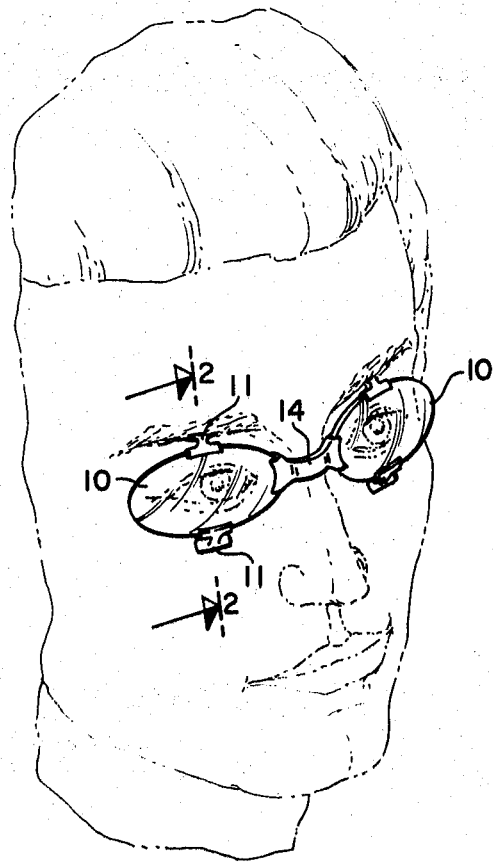
FIG. 1 is a perspective view of eyeglass frames constructed in accordance with the present invention, shown secured on the face of the wearer during use.
Figure 2:
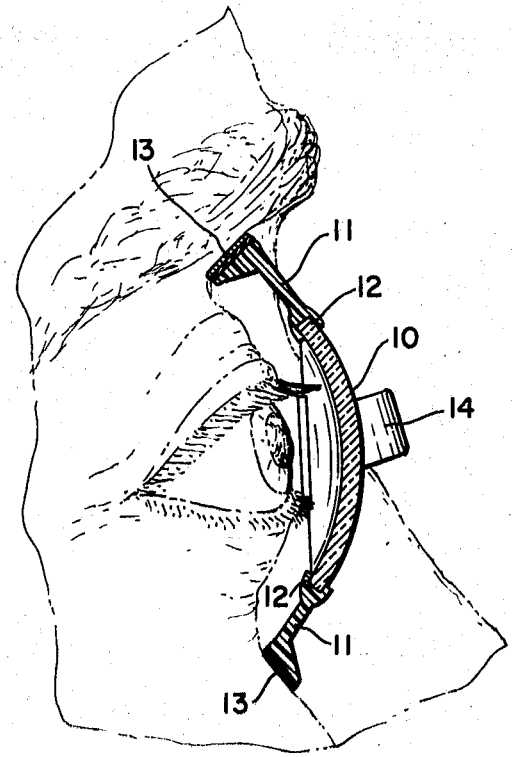
FIG. 2 is a cross-sectional view of the eyeglass frames taken along section 2—2 of FIG. 1.

Referring to the drawings, eyeglass lenses 10 are secured adjacent the eyes of the wearer by I-shaped support members 11, which are mounted on the upper and lower edges of the lenses and are vertically disposed so as to engage the skin above and below the eye and in the eye socket of the wearer. Members 11 are provided with horizontally disposed elongated slots 12, which frictionally engage and receive lenses 10 so that they are slidable along the edges of the lenses. The ends of members 11 which engage the skin of the wearer are provided with suitable adhesive means, such as adhesive tape 13, so that the lenses will be held securely in place during use on the skin of the wearer. The adhesive tape may be double-sided, or glued to members 11, in order to affix the tape thereto. However, tape 13 may also additionally include magnetic material, so that if members 11 are constructed of some suitable type of metallic material, they may be disengaged from the face of the wearer without removing tape 13 after it has been placed in position.

Figure 3:
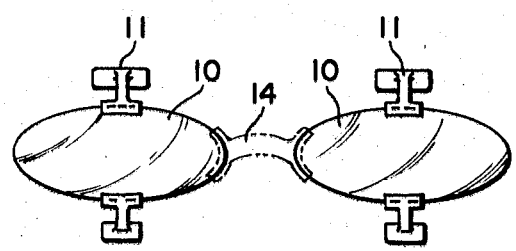
FIG. 3 is a front view of the eyeglass frames of the present invention showing the optional nose bridge member.

Optional nose bridge member 14 may also be provided to furnish additional support on the nose of the wearer. Member 14 is substantially I-shaped and is provided with slots in the ends thereof which frictionally engage the lateral sides of lenses 10. The lenses are adjustable within the slots so that comfortable positioning of the glasses on the face of the wearer may be achieved. It should be noted that nose bridge member 14 is completely optional, and need not be provided to support the lenses on the face of the wearer. As shown in FIG. 3, it is merely an additional means for furnishing support of the lenses on the face of the wearer during use.

Figure 4:
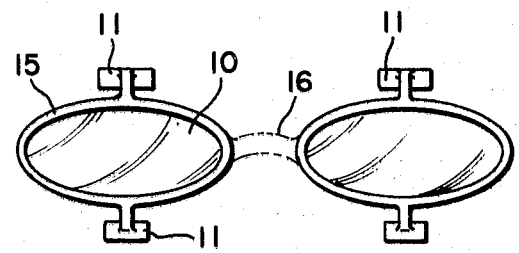
FIG. 4 is an illustration of a second embodiment of eyeglass frames constructed in accordance with the present invention, in which the supporting members are integrally formed with lens frames encompassing the entire periphery of the eyeglass lenses.

FIG. 4 illustrates another embodiment of the present invention in which lenses 10 are mounted in frames 15 which fully encompass the lenses and are integrally formed with supporting members 11. This embodiment may also be provided with optional nose bridge member 16 which, if supplied, is integrally formed with frames 15 as are members 11. However, it should again be noted that the nose bridge is a completely optional item, and need not be included to provide sufficient support on the face of the user for the lenses.

The support members may be constructed of any suitable material, such as metal or elastomeric plastic, or reinforced or impregnated fabric. The lenses may be conventional glass or, in order to reduce weight, plastic. The choice of materials, however, is completely arbitrary.

In dispensing the eyeglasses of the present invention, lenses 10 are ground to fill the prescription required by the wearer. Mounting members 10 and optional nose piece 14 may then be attached to the lenses as previously described. Fitting of the frames is not necessary, and the glasses are therefore available for immediate use by the wearer. If adjustment of the lenses with respect to the eye of the person is necessary, the mounting members may be slidably moved in the appropriate direction on the edges of the lenses until a proper fit is obtained. The position of the mounting members on the skin of the person may also be changed to further aid in the adjustment of the lenses in front of the eyes of the wearer.

The positioning of the eyeglass lenses adjacent the eyes of the wearer has several distinct advantages over conventional eyeglasses. Since each lens is supported closer to the eye than with conventional glasses, they are ground with a greater curvature than conventional lenses so that they will provide the same vision correction as a lens positioned further away from the eye. The accuracy of grinding the lens to the required prescription increases as the curvature increases. Thus, a more precise correction of the vision is achieved by the invention. Furthermore, since the lenses are supported closer to the eye, they may be constructed considerably smaller than conventional lenses without reducing the corrected field of vision. The smaller dimensions of the lenses also reduce the lens weight, and the eyeglasses of the present invention will therefore weigh substantially less than conventional eyeglass frames. The consequent reduction in materials needed for manufacturing the glasses also reduces their cost.

While only several embodiments of the present invention have been shown and described, it will be obvious to one skilled in the art that many changes and modifications may be made thereunto without departing from the spirit and scope of the invention.

What is claimed is:

1. Apparatus for supporting eyeglass lenses adjacent the eyes of the wearer, comprising:
   at least one lens frame;
   a plurality of I-shaped support members, integrally formed with said lens frame, extending outwardly in opposite directions from said lens frame; and
   adhesive means, affixed to the ends of said support members, for engaging the skin of the wearer adjacent the eye thereof and securing said lens frame thereto during use.

2. The apparatus as recited in claim 1, wherein said adhesive means comprises adhesive tape.

3. The apparatus as recited in claim 2, wherein said support members are constructed of magnetically attracted metallic material, and wherein said adhesive tape further comprises magnetic material.

4. The apparatus as recited in claim 3, wherein the apparatus includes a pair of lens frames, and further comprises a nose bridge member, integrally formed with said lens frames, for joining said lens frames and supporting said frames on the nose of the wearer.

* * * * *